US009571406B2

(12) United States Patent
Bergamasco et al.

(10) Patent No.: US 9,571,406 B2
(45) Date of Patent: Feb. 14, 2017

(54) NETWORK CONGESTION MANAGEMENT BASED ON COMMUNICATION DELAY

(75) Inventors: Davide Bergamasco, Sunnyvale, CA (US); Irfan Ahmad, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 251 days.

(21) Appl. No.: 13/281,337

(22) Filed: Oct. 25, 2011

(65) Prior Publication Data
US 2013/0100816 A1 Apr. 25, 2013

(51) Int. Cl.
*H04L 12/26* (2006.01)
*H04L 12/825* (2013.01)
*H04L 12/841* (2013.01)

(52) U.S. Cl.
CPC .......... *H04L 47/25* (2013.01); *H04L 43/0864* (2013.01); *H04L 47/283* (2013.01)

(58) Field of Classification Search
CPC ........ H04L 47/25; H04L 47/10; H04L 47/283; H04L 43/16; H04L 47/11; H04L 47/18; H04L 47/29; H04L 41/0896; H04L 41/5009; H04L 43/0852; H04L 43/0864; H04L 43/0888; H04L 12/2602; H04L 43/106; H04L 45/121; H04L 47/263
USPC 370/237, 235, 230, 412, 229, 389; 714/781, 752
See application file for complete search history.

(56) References Cited

U.S. PATENT DOCUMENTS

| 7,248,564 | B1 * | 7/2007 | Grosdidier et al. .......... 370/235 |
| 2005/0058131 | A1 * | 3/2005 | Samuels ................. H04L 12/24 370/389 |
| 2005/0271071 | A1 * | 12/2005 | Madhavapeddi et al. .... 370/412 |
| 2006/0159098 | A1 * | 7/2006 | Munson et al. .............. 370/394 |
| 2006/0285489 | A1 * | 12/2006 | Francisco et al. ........... 370/229 |
| 2009/0122697 | A1 * | 5/2009 | Madhyasha ......... H04L 12/2697 370/229 |
| 2011/0078532 | A1 * | 3/2011 | Vonog ................... G06F 3/1454 714/752 |
| 2011/0216648 | A1 * | 9/2011 | Mehrotra ................ H04L 47/30 370/230 |
| 2011/0219287 | A1 * | 9/2011 | Srinivas et al. .............. 714/781 |
| 2013/0003538 | A1 * | 1/2013 | Greenberg ............. H04L 47/12 370/230 |
| 2014/0198658 | A1 * | 7/2014 | Ajima et al. ................. 370/235 |

FOREIGN PATENT DOCUMENTS

JP  WO 2013/042219 A1 * 9/2013
WO  WO 2013/042219 A1 * 9/2013

OTHER PUBLICATIONS

C. Jin et al., "Fast TCP: From Theory to Experiments", Dec. 6, 2003, pp. 1-11.

\* cited by examiner

*Primary Examiner* — Brian O'Connor
*Assistant Examiner* — Lionel Preval (57) ABSTRACT

Embodiments determine communication delay along a network path between a source and a destination in a network. A target injection rate is calculated based on the determined delay and a predetermined maximum queuing delay threshold. Data packets are transmitted along the network path using an inter-packet delay that is based on the target injection rate.

25 Claims, 6 Drawing Sheets

NETWORK CONGESTION MANAGEMENT BASED ON COMMUNICATION DELAY

BACKGROUND

Computer systems may be networked, such that software executing on one computing device may access hardware and/or software resources provided by another computing device. Further, software entities, such as virtual machines (VMs), may be executed by a group, or "cluster," of networked host computing devices. Each VM creates an abstraction of physical computing resources, such as a processor and memory, of the host executing the VM and executes a "guest" operating system, which, in turn, executes one or more applications. The abstracted resources may be functionally indistinguishable from the underlying physical resources to the guest operating system and software applications.

The overall performance of such a cluster may be constrained by congestion in the network interconnecting the hosts. Congestion may be addressed at the level of a communication protocol, whether as an inherent feature of the protocol or as an extension to the protocol. For example, a host may execute a congestion management scheme and reduce its packet injection rate or "throttle down" when congestion is indicated by the communication protocol. However, such an approach may result in inconsistent throttling if any hosts use a different communication protocol and/or if not all hosts honor the congestion management scheme. Further, congestion may be addressed at least in part by collecting network performance data (e.g., round trip time) from network hardware, such as switches. Such network performance data may not accurately represent congestion between two endpoints, however, because performance measurements determined by network hardware may exclude at least the link between the network hardware and one of the endpoints.

SUMMARY

Disclosed herein are embodiments that enable a highly desirable improvement in congestion management and, accordingly, an improvement in overall performance of a networked computer system. Such embodiments provide a congestion management system that is operable to execute at the software application (e.g., VM) level and to determine congestion without relying on intermediate network hardware, independent of the communication protocol used between endpoints.

A queuing delay along a network path between a source and a destination in a network is determined based on, for example, a round trip time measured along the network path. A target injection rate is calculated based on the queuing delay, a maximum queuing delay threshold, a latency ratio, and/or a minimum injection rate. The target injection rate may be further based on a weighted moving average, such as by weighting a current raw injection rate and a previously determined target injection rate using a responsiveness parameter. Data packets are transmitted along the network path using an inter-packet delay that is based on the target injection rate.

This summary introduces a selection of concepts that are described in more detail below. This summary is not intended to identify essential features, nor to limit in any way the scope of the claimed subject matter.

DETAILED DESCRIPTION

Congestion in computer networks has attracted significant interest from both the scientific and industry communities. Even temporary congestion is undesirable because it may lead to bandwidth wastage, increased end-to-end latency, under-utilization of resources, and ultimately suboptimal performance of a computing system.

Without adequate congestion management, the network fabric associated with cloud-scale, virtualized datacenters needs to be over-provisioned to reduce communication bottlenecks. Despite the significant cost, however, over-provisioning does not necessarily imply that congestion will not occur. For example, inter-VM communication patterns are dynamic (e.g., in the case of VM migrations between hosts). Thus, there is no a-priori guarantee in existing systems that the aggregate traffic driven by the VMs on any given network path will never exceed the network path's capacity.

Embodiments described herein enable congestion management in a networked computing system, such as a cloud-scale network, by controlling the rate of individual traffic flows. For example, the injection rate of data packets may be controlled at a virtual machine (VM) and/or at a virtual communication interface, also known as a virtual network interface card (vNIC). In some embodiments, VMs are executed by host computing devices, and the hosts identify bottlenecks (e.g., congested paths) in the network fabric. For each contended network path, the systems described may ensure that (1) the aggregate load (e.g., network traffic) does not exceed the bottleneck capacity, and/or (2) capacity is shared in proportional fashion amongst the contending flows. Accordingly, in some embodiments, congestion management is performed at the VM level, does not rely on the network infrastructure for congestion feedback, and works with data communicated using a plurality of protocols. Exemplary protocols include transmission control protocol (TCP), user datagram protocol (UDP), and Ethernet.

Embodiments provided further facilitate increasing the quality of service provided by a given network as well as decreasing the overall capacity provisioned, potentially lowering network costs. Such embodiments enable controlling directly the rate at which data packets are transmitted or "injected" into a network path and/or a flow, as opposed to other techniques, such as adjusting a Transmission Control Protocol (TCP) window. Accordingly, relatively fine granularity in the rate adjustment is provided, potentially avoiding the injection of large bursts of traffic in the network.

Exemplary embodiments calculate queuing delay based on instantaneous value round trip time (RTT) values, facilitating relatively quick algorithm responsiveness. Further, such embodiments calculate an injection rate based on this calculated queuing delay, rather than the raw RTT value. Such an approach accommodates datacenter switches, which tend to have significantly smaller buffers than internet routers. Accordingly, the queuing delay may represent a smaller portion of the RTT in a datacenter environment, resulting in a compressed dynamic range of measures such as a base RTT/RTT ratio. Using the queuing delay may enable the calculated latency ratio to span the full exemplary dynamic range [0, 1].

Further, the latency ratio may be negative if the queuing delay is great enough (e.g., greater than a maximum queuing delay threshold). In such a scenario, which may indicate substantial network congestion, a fraction of the current injection rate may be subtracted in the computation of the new injection rate.

Figure 1:
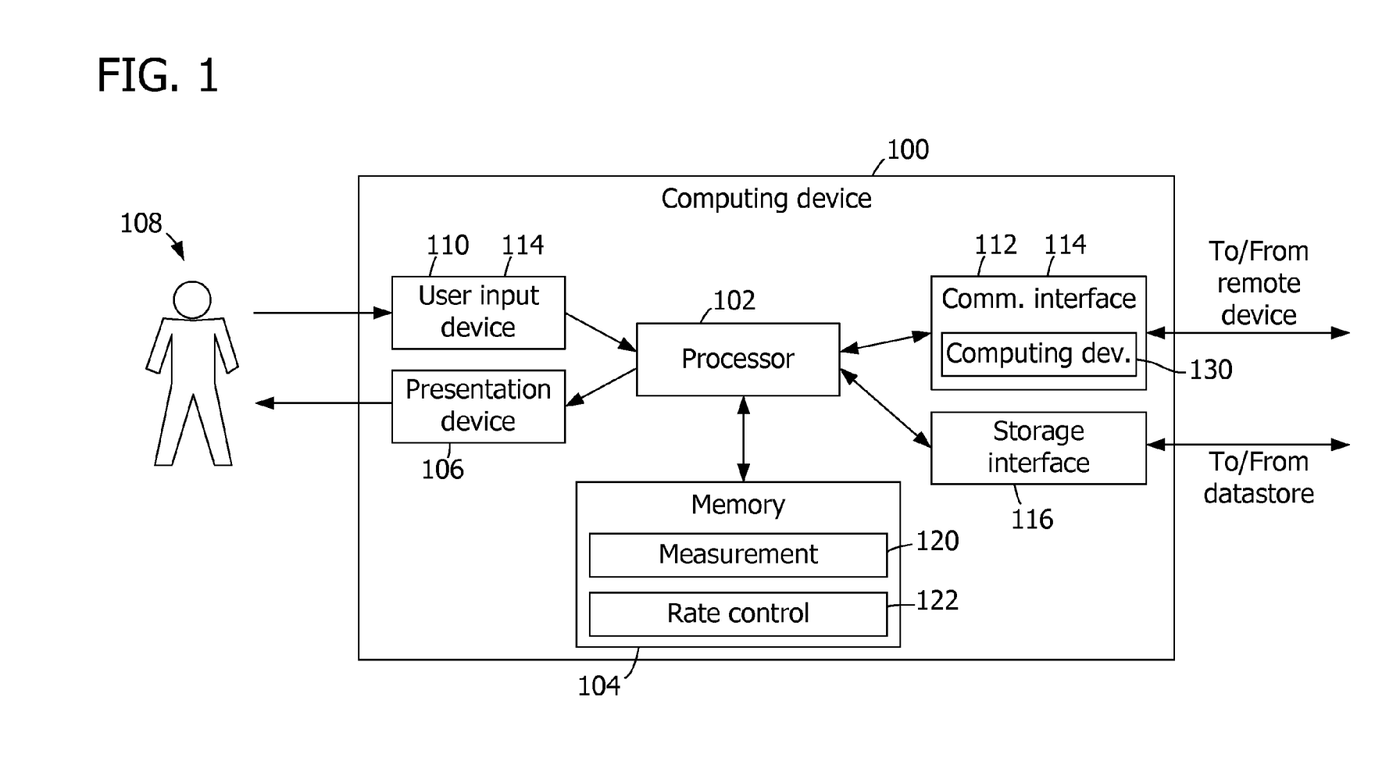
FIG. 1 is a block diagram of an exemplary computing device.

FIG. 1 is a block diagram of an exemplary computing device 100. Computing device 100 includes a processor 102 for executing instructions. In some embodiments, executable instructions are stored in a memory 104. Memory 104 is any device allowing information, such as executable instructions, target injection rates, configuration options (e.g., parameters and/or threshold values), and/or other data, to be stored and retrieved. For example, memory 104 may include one or more random access memory (RAM) modules, flash memory modules, hard disks, solid state disks, and/or optical disks.

Computing device 100 also includes at least one presentation device 106 for presenting information to a user 108. Presentation device 106 is any component capable of conveying information to user 108. Presentation device 106 may include, without limitation, a display device (e.g., a liquid crystal display (LCD), organic light emitting diode (OLED) display, or "electronic ink" display) and/or an audio output device (e.g., a speaker or headphones). In some embodiments, presentation device 106 includes an output adapter, such as a video adapter and/or an audio adapter. An output adapter is operatively coupled to processor 102 and configured to be operatively coupled to an output device, such as a display device or an audio output device.

The computing device 100 may include a user input device 110 for receiving input from user 108. User input device 110 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 106 and user input device 110.

Computing device 100 also includes a communication interface 112, which enables computing device 100 to communicate with a remote device (e.g., another computing device 100) via a communication medium, such as a wired or wireless packet network. For example, computing device 100 may transmit and/or receive data via communication interface 112. User input device 110 and/or communication interface 112 may be referred to as an input interface 114 and may be configured to receive information, such as configuration options (e.g., threshold values), from a user.

Computing device 100 further includes a storage interface 116 that enables computing device 100 to communicate with one or more datastores. In exemplary embodiments, storage interface 116 couples computing device 100 to a storage area network (SAN) (e.g., a Fibre Channel network) and/or to a network-attached storage (NAS) system (e.g., via a packet network). The storage interface 116 may be integrated with communication interface 112.

In exemplary embodiments, memory 104 stores computer-executable instructions for performing one or more of the operations described herein. Memory 104 may include one or more computer-readable storage media that have computer-executable components embodied thereon. In the example of FIG. 1, memory 104 includes a measurement component 120 and a rate control component 122.

When executed by processor 102, measurement component 120 causes processor 102 to calculate a queuing delay associated with a network path based on a round trip time (RTT) measured along the network path. When executed by processor 102, rate control component 122 causes processor 102 to calculate a latency ratio based on the queuing delay and a predetermined maximum queuing delay threshold, to calculate a target injection rate based on the latency ratio, and to transmit a plurality of data packets along the network path using an inter-packet delay that is based on the target injection rate. Any portion of the illustrated components may be included in memory 104 based on the function of computing device 100.

In some embodiments, one or more components of computing device 100 include another instance of computing device 100. For example, communication interface 112 may include an embedded computing device 130 configured to perform operations specific to the function of communication interface 112. In exemplary embodiments, at least a portion of memory 104 in embedded computing device 130 includes measurement component 120 and/or rate control component 122. This portion of memory 104 in embedded computing device 130 may be referred to as firmware. Such embodiments facilitate performing at least a portion of the congestion management operations described herein using dedicated hardware (e.g., embedded computing device 130), such that these operations are offloaded from computing device 100. Accordingly, resources (e.g., processor 102 and/or memory 104) of computing device 100 that would otherwise be allocated to congestion management may be used to perform other functions, such as executing software applications (e.g., VMs).

Figure 2:
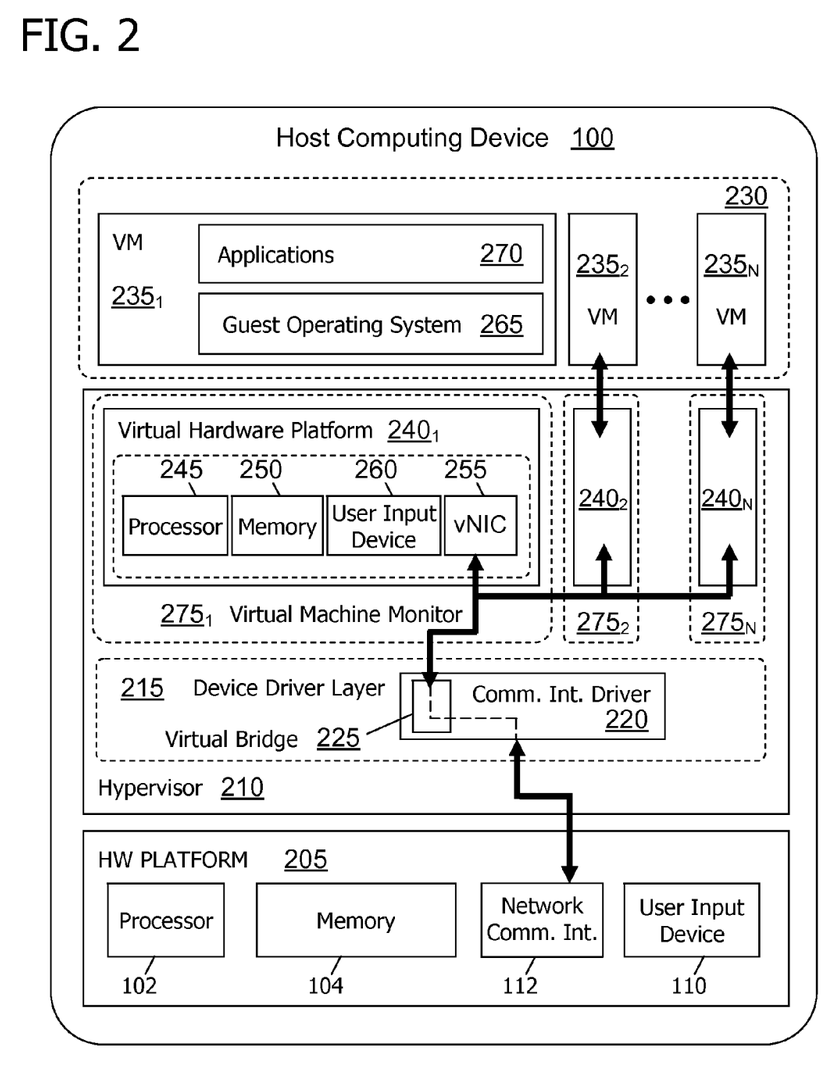
FIG. 2 is a block diagram of virtual machines that are instantiated on a computing device, such as the computing device shown in FIG. 1.

FIG. 2 depicts a block diagram of virtual machines $235_1$, $235_2$ ... $235_N$ that are instantiated on a computing device 100, which may be referred to as a host computing device or simply a host. Computing device 100 includes a hardware platform 205, such as an x86 architecture platform. Hardware platform 205 may include processor 102, memory 104, communication interface 112, user input device 110, and other input/output (I/O) devices, such as a presentation device 106 (shown in FIG. 1). A virtualization software layer, also referred to hereinafter as a hypervisor 210, is installed on top of hardware platform 205.

The virtualization software layer supports a virtual machine execution space 230 within which multiple virtual machines (VMs $235_1$-$235_N$) may be concurrently instantiated and executed. Hypervisor 210 includes a device driver layer 215, and maps physical resources of hardware platform 205 (e.g., processor 102, memory 104, communication interface 112, and/or user input device 110) to "virtual" resources of each of VMs $235_1$-$235_N$ such that each of VMs $235_1$-$235_N$ has its own virtual hardware platform (e.g., a corresponding one of virtual hardware platforms $240_1$-$240_N$), each virtual hardware platform having its own emulated hardware, such as a processor 245, a memory 250, a communication interface such as a virtual network interface card (vNIC) 255, a user input device 260 and/or other emulated I/O devices in VM $235_1$.

In some embodiments, memory 250 in first virtual hardware platform 240₁ includes a virtual disk that is associated with or "mapped to" one or more virtual disk images stored in memory 104 (e.g., a hard disk or solid state disk) of computing device 100. The virtual disk image represents a file system (e.g., a hierarchy of directories and files) used by first virtual machine 235₁ in a single file or in a plurality of files, each of which includes a portion of the file system. In addition, or alternatively, virtual disk images may be stored in memory 104 of one or more remote computing devices 100, such as in a storage area network (SAN) configuration. In such embodiments, any quantity of virtual disk images may be stored by the remote computing devices 100.

Device driver layer 215 includes, for example, a communication interface driver 220 that interacts with communication interface 112 to receive and transmit data from, for example, a local area network (LAN) connected to computing device 100. Communication interface driver 220 also includes a virtual bridge 225 that simulates the broadcasting of data packets in a physical network received from one communication interface (e.g., communication interface 112) to other communication interfaces (e.g., the virtual communication interfaces of VMs 235₁-235$_N$). Each virtual communication interface for each VM 235₁-235$_N$, such as vNIC 255 for first VM 235₁, may be assigned a unique virtual Media Access Control (MAC) address that enables virtual bridge 225 to simulate the forwarding of incoming data packets from communication interface 112. In an embodiment, communication interface 112 is an Ethernet adapter that is configured in "promiscuous mode" such that all Ethernet packets that it receives (rather than just Ethernet packets addressed to its own physical MAC address) are passed to virtual bridge 225, which, in turn, is able to further forward the Ethernet packets to VMs 235₁-235$_N$. This configuration enables an Ethernet packet that has a virtual MAC address as its destination address to properly reach the VM in computing device 100 with a virtual communication interface that corresponds to such virtual MAC address.

Virtual hardware platform 240₁ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 265 in order to execute applications 270 for an instantiated VM, such as first VM 235₁. Virtual hardware platforms 240₁-240$_N$ may be considered to be part of virtual machine monitors (VMM) 275₁-275$_N$ which implement virtual system support to coordinate operations between hypervisor 210 and corresponding VMs 235₁-235$_N$. Those with ordinary skill in the art will recognize that the various terms, layers, and categorizations used to describe the virtualization components in FIG. 2 may be referred to differently without departing from their functionality or the spirit or scope of the disclosure. For example, virtual hardware platforms 240₁-240$_N$ may also be considered to be separate from VMMs 275₁-275$_N$, and VMMs 275₁-275$_N$ may be considered to be separate from hypervisor 210. One example of hypervisor 210 that may be used in an embodiment of the disclosure is included as a component in VMware's ESX brand software, which is commercially available from VMware, Inc.

Figure 3:
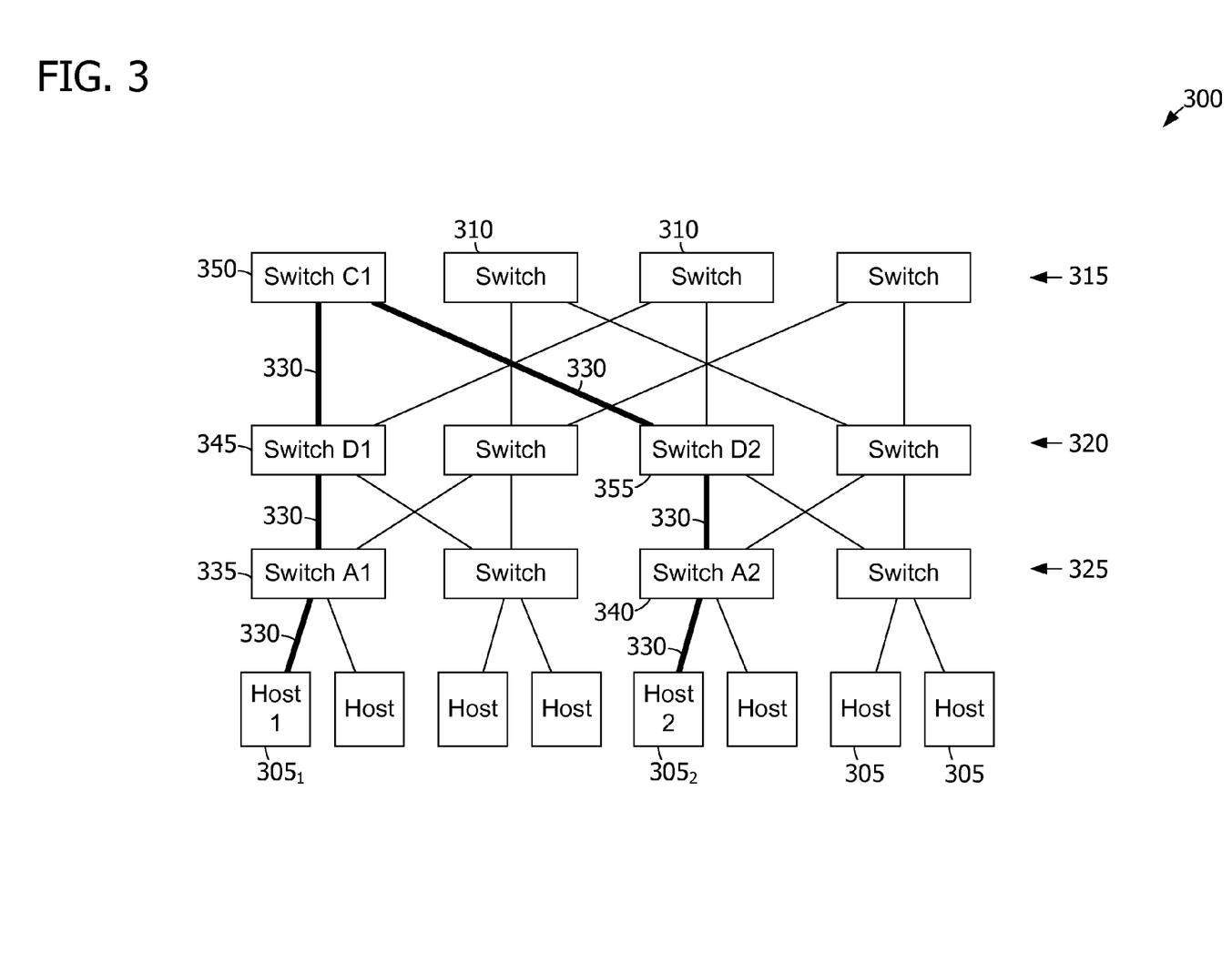
FIG. 3 is a block diagram of an exemplary datacenter system including a plurality of hosts (e.g., instances of the computing device shown in FIG. 1) that are connected in communication with each other by a plurality of switches.

FIG. 3 is a block diagram of an exemplary datacenter system 300 including a plurality of hosts 305 (e.g., instances of computing device 100, shown in FIG. 1) that are connected in communication with each other by a plurality of switches 310. For example, system 300 may include core switches 315, distribution switches 320, and access switches 325. In exemplary embodiments, hosts 305 are connected to access switches 325, access switches 325 are connected to distribution switches 320, and distribution switches 320 are connected to core switches 315.

Further, system 300 may include a plurality of connections between access switches 325 and distribution switches 320, and between distribution switches 320 and core switches 315. Accordingly, redundant network paths may be provided between any given pair of access switches 325.

In operation, one or more network paths between endpoints (e.g., hosts 305 and/or VMs executed by hosts 305) may become congested. In such situations, communication between endpoints at opposite sides of a congested network path may be negatively affected (e.g., subject to latency and/or dropped packets), potentially also negatively affecting operation of the endpoints. For example, a VM attempting to access data provided by another VM may become inoperable until the congestion along the network path between the VMs subsides.

Exemplary embodiments provide congestion management, using delay as a measure of congestion. VMs executed by hosts 305 repeatedly (e.g., periodically, continuously, and/or upon request) measure the round trip time (RTT) of packets transmitted along network paths used to communicate with other VMs in system 300. When the RTT of a network path increases, it is likely that congestion on some link of that network path has increased, and the associated queue of data packets is becoming occupied with data packets. In exemplary embodiments, in response to detected congestion, the traffic injection rate of VMs communicating along the affected network path is decreased or "throttled down." Conversely, when the RTT decreases, it is likely that the previously congested link is no longer congested, and the associated queue is being emptied of data packets. In response, the traffic injection rate of VMs communicating along the network path is increased or "throttled up."

By repeatedly adjusting the traffic injection rate based on the measured RTT, embodiments described facilitate ensuring that, at the equilibrium, the aggregate offered load to the bottleneck link does not exceed the capacity of the bottleneck link, resulting in a virtually empty queue and a fully utilized link. Further, such embodiments, enable ensuring that contending flows share the bottleneck bandwidth in a proportional or "fair" fashion, optionally as determined by a configurable share entitlement parameter, which may be expressed as a minimum injection rate.

Figure 4:
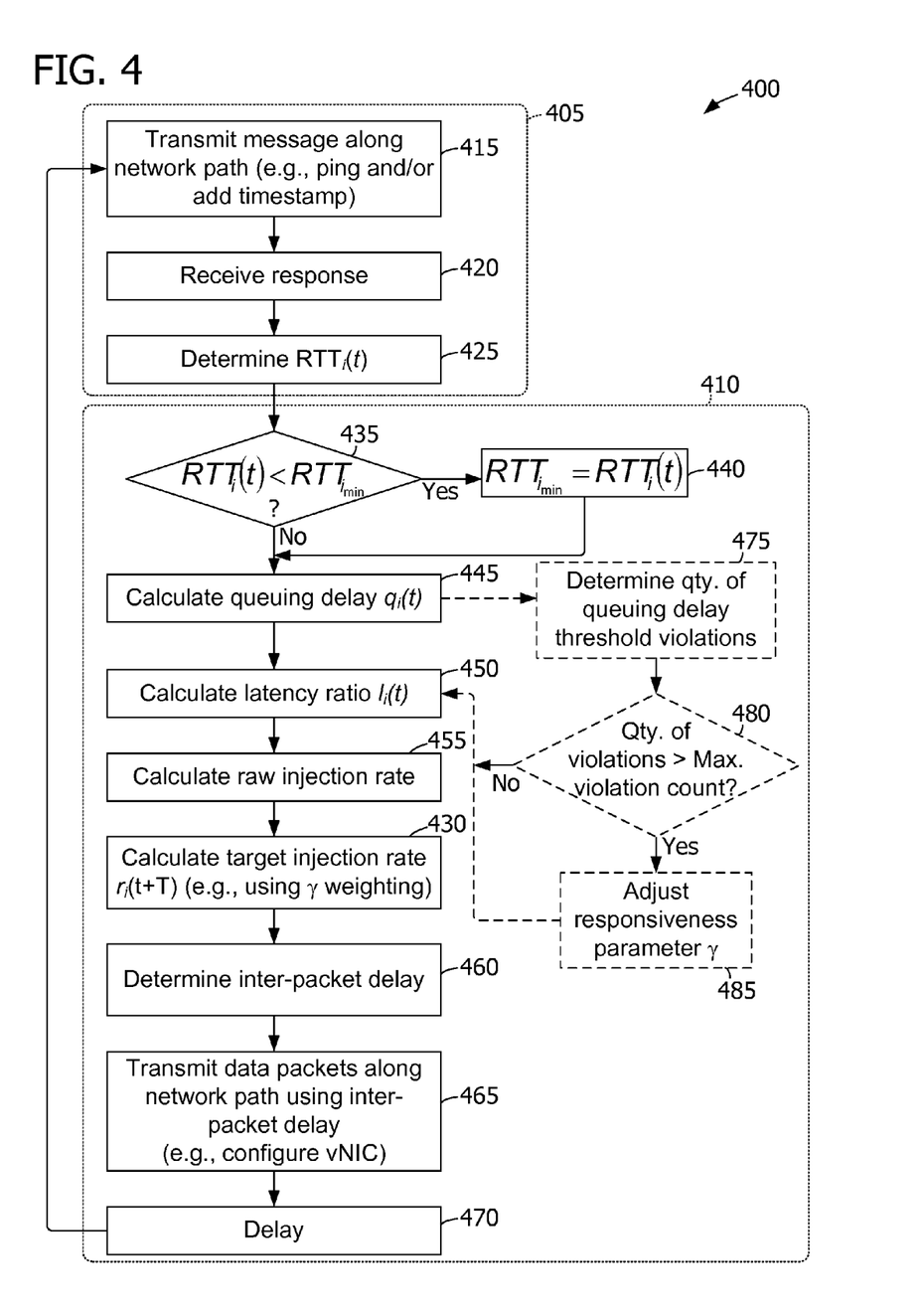
FIG. 4 is a flowchart of an exemplary method performed by a host such as the hosts shown in FIG. 3.

FIG. 4 is a flowchart of an exemplary method 400 performed by a host 305 (shown in FIG. 3). In exemplary embodiments, method 400 is performed by a plurality of hosts 305 within system 300 (shown in FIG. 3) to manage network congestion, such as network congestion between VMs executed by hosts 305. However, referring to FIGS. 1 and 4, it is contemplated that method 400 may be performed by any computing device 100.

In exemplary embodiments, method 400 includes measurement operations 405 that are performed by measurement component 120 and rate control operations 410 that are performed by rate control component 122. Measurement operations 405 and rate control operations 410 may be performed in series, such as by executing measurement operations 405 and then executing rate control operations 410, or in parallel (e.g., concurrently). Further, in some embodiments, measurement operations 405 and rate control operations 410 are performed by a hypervisor 210 (shown in FIG. 2) that is executed by the computing device 100.

Referring to FIGS. 3 and 4, in exemplary embodiments, a VM executed by a first host $305_1$ communicates with a VM executed by a second host $305_2$ along a network path 330 (illustrated as a bold line in FIG. 3) that extends from first host $305_1$ to second host $305_2$ via a first access switch 335, a first distribution switch 340, a first core switch 345, a second distribution switch 350, and a second access switch 355. Method 400 is described below with reference to network path 330. In some embodiments, a host 305 communicates with a plurality of other hosts 305 along a plurality of network paths and executes method 400 with respect to each network path. Accordingly, first host $305_1$ may determine a first target injection rate corresponding to network path 330 between first host $305_1$ and second host $305_2$, and may further determine another target injection rate corresponding to another network path between first host $305_1$ and another host 305.

RTT Measurement

In exemplary embodiments, first host $305_1$ executes measurement operations 405 to calculate an RTT associated with network path 330. More specifically, the RTT may represent the communication delay associated with network path 330 between a network source (e.g., first host $305_1$) and a network destination (e.g., second host $305_2$). In addition to being accurate, the measurement technique described also provides a low resource overhead in terms of processing and/or bandwidth. In simulation experiments, an acceptable balance between performance and resource usage may be achieved with a measurement interval T of 1 millisecond to 2 milliseconds. Further, RTT measurement performed by a host 305 is not inherently associated with any particular communication protocol. Rather, the technique described may be practiced with data communicated by a variety of protocols, such as any Layer 2 (e.g., Ethernet), Layer 3 (e.g., Internet Protocol), and/or Layer 4 (e.g., Transmission Control Protocol and/or User Datagram Protocol) traffic flow, as defined by the Open Systems Interconnection (OSI) model. For example, first host $305_1$ may perform measurement operations 405 after a VM and/or a hypervisor executed by first host $305_1$ determines that a network destination (e.g., second host $305_2$ and/or a VM or a hypervisor executed by second host $305_2$) performs congestion management as described herein.

In exemplary embodiments, first host $305_1$ transmits 415 a message to the network destination (e.g., second host $305_2$) along network path 330 and receives 420 a response to the message from the network destination. For example, messages may be transmitted 415 and received 420 by a communication interface 112 (shown in FIG. 1). First host $305_1$ determines 425 a round trip time (RTT) corresponding to network path 330 between first host $305_1$ and second host $305_2$ based on the transmitted message and the received response.

The RTT measurement strategy may be selected based on the communication protocol used. In some embodiments, first host $305_1$ adds a transmission timestamp to a network packet that is addressed to the network destination. The timestamp represents the current time when the transmission timestamp is added to the network packet. First host $305_1$ transmits 415 the network packet to the destination and receives 420 a response that includes the transmission timestamp. First host $305_1$ determines 425 the RTT by determining an elapsed time between the transmission timestamp from the received response and the current time.

Measurement at Layer 2 may be performed by means of ping-like frames that elicit the transmission of an echo frame by the destination. When a measurement has to be taken, the source VM (e.g., executed by first host $305_1$) generates a Layer 2 ping frame containing a timestamp drawn from a local clock at first host $305_1$. Upon receiving a Layer 2 ping, the destination VM (e.g., executed by second host $305_2$) responds with an echo replay frame in which it copies the timestamp from the ping frame. The RTT may be determined 425 by subtracting the timestamp value from the current value of the local clock at the source. This technique does not require keeping any state or performing any complex parsing of the traffic originated or received by a VM.

In the context of a Transmission Control Protocol (TCP) flow in which the Timestamp (TS) option is enabled, when a TCP segment carrying such an option is being transmitted 415, measurement component 120 may record the TS Value field along with a timestamp drawn from a local clock at the source. The destination may echo the TS Value in the TS Echo Replay field of the Timestamp option attached to the acknowledgement (ACK) to the original segment. When an ACK segment is received 420 with a Timestamp option that contains a TS Echo Replay matching a stored TS Value, measurement component 120 may determine 425 the RTT as the difference of the current time and the timestamp stored with the TS Value.

In the absence of an explicit Timestamp option, TCP sequence numbers may be used in a similar fashion. When a TCP segment is being transmitted 415, its sequence number is recorded along with a timestamp drawn from a local clock at the source. When an ACK segment is received 420 whose acknowledgement number is equal to or greater than the stored sequence number, measurement component 120 may determine 425 the RTT as the difference of the current time from the clock and the timestamp stored with the sequence number.

In the case of Layer 4 protocols other than TCP, the RTT measurement may be performed at the Internet Protocol (IP) level using the IP Timestamp option. For example, the IP Timestamp option may be used in a manner similar to the manner in which the TCP Timestamp option is used, as described above.

As another example, Virtual Distributed Layer 2 (vDL2) is a packet tunneling technique that may be used to provide a scalable Layer 2 interconnect spanning multiple geographically distributed physical networks. A timestamp field may be added to a vDL2 header when transmitting 415 a packet. When set to a nonzero value, the timestamp field elicits an echo from the destination endpoint of the vDL2 tunnel. This echo may be received 420 and used to determine 425 the RTT in a manner similar to that described with reference to the use of ping-like frames with a Layer 2 protocol.

In exemplary embodiments, the RTT is determined 425 as an instantaneous RTT value. For example, a single difference between a receipt timestamp and a transmission timestamp may be used to calculate the RTT. Alternatively, the RTT may be calculated as a moving average RTT, such as by averaging a plurality of recent instantaneous RTT values.

Rate Control

First host $305_1$ calculates 430 a target injection rate $r_i$ corresponding to a flow i along network path 330 based on the RTT and one or more other factors, such as a predetermined maximum queuing delay threshold, a calculated queuing delay, a minimum injection rate, a latency ratio, a raw injection rate, a previously determined target injection rate and/or a responsiveness parameter. In exemplary embodiments, first host $305_1$ calculates 430 $r_i$ using Equation 1.

$$r_i(t+T) \leftarrow (1-\gamma)r_i(t) + \gamma(l_i(t)r_i(t) + r_{i_{min}})  \quad \text{(Eq. 1)}$$

Variables in Equation 1 may be defined as shown in Table 1 below.

TABLE 1

| | |
|---|---|
| T | The RTT measurement interval. |
| γ | Responsiveness parameter, between 0 and 1. |
| $r_{i_{min}}$ | A parameter that represents the minimum injection rate of flow i, i's share entitlement of the bottleneck bandwidth, and/or a priority associated with the network source and/or network destination (e.g., a VM) of flow i. |
| $l_i(t)$ | Latency ratio of flow i. |

The latency ratio $l_i(t)$ may be based on a queuing delay $q_i(t)$ and a predetermined (e.g., configurable) maximum queuing delay threshold, as described below. The queuing delay $q_i(t)$, in turn, may be based on the RTT determined 425 by measurement component 120 (shown in FIG. 1), denoted below as $RTT_i(t)$, and a minimum observed queuing delay associated with network path 330 and/or flow i, denoted as $RTT_{i_{min}}$. In exemplary embodiments, after $RTT_i(t)$ is determined 425, first host 305$_1$ compares 435 $RTT_i(t)$ to $RTT_{i_{min}}$. If $RTT_i(t)$ is less than $RTT_{i_{min}}$, first host 305$_1$ sets 440 $RTT_{i_{min}}$ equal to $RTT_i(t)$.

First host 305$_1$ calculates 445 the queuing delay $q_i(t)$ corresponding to flow i. In exemplary embodiments, $q_i(t)$ is calculated as the difference between $RTT_i(t)$ and $RTT_{i_{min}}$, as shown in Equation 2 below.

$$q_i(t) = RTT_i(t) - RTT_{i_{min}} \quad \text{(Eq. 2)}$$

First host 305$_1$ proceeds to calculate 450 the latency ratio $l_i(t)$. For example, $l_i(t)$ may be calculated according to Equation 3 below.

$$l_i(t) = \max\left(-1, \frac{q_{max} - q_i(t)}{q_{max}}\right) \quad \text{(Eq. 3)}$$

In Equation 3, $q_{max}$ is a predetermined maximum queuing delay threshold, a parameter specifying the maximum queuing latency tolerable (e.g., by one or more users, applications, and/or operators).

In Equation 1, the term $l_i(t)r_i(t) + r_{i_{min}}$ may be referred to as a raw injection rate. In some embodiments, the raw injection rate may be calculated 455 and used as the target injection rate $r_i$. In other embodiments, first host 305$_1$ calculates 430 a new target injection rate $r_i(t+T)$ by combining a current calculation (e.g., the raw injection rate) with one or more previous calculations, such as a previously determined target injection rate $r_i(t)$. For example, the current calculation and the previous calculation may be combined using a weighted moving average.

In exemplary embodiments, and as shown in Equation 1, the weighted moving average is based on a responsiveness parameter γ that represents a weight to apply to the current calculation. Conversely, (1−γ) represents a weight to apply to the previous calculation.

First host 305$_1$ determines 460 an inter-packet delay, which may be referred to as a temporal spacing, based on the target injection rate $r_i(t+T)$, such as by inverting $r_i(t+T)$. For example, if the target injection rate is equal to 4.0 packets per second, the inter-packet delay may be determined 460 to be 0.25 seconds.

First host 305$_1$ transmits 465 a plurality of data packets from the network source (e.g., a VM executed by first host 305$_1$) to the network destination (e.g., a VM executed by second host 305$_2$) using the inter-packet delay. Referring also to FIG. 2, in some embodiments, hypervisor 210 configures virtual network interface card (vNIC) 255 associated with first VM 235$_1$ to transmit data packets from first VM 235$_1$ to the network destination and/or to any network destination along network path 330 based on the target injection rate and/or the inter-packet delay. For example, vNIC 255 may be configured to delay the transmission of network packets in an outgoing queue associated with VM 235$_1$.

In exemplary embodiments, first host 305$_1$ performs method 400 repeatedly, delaying 470 (e.g., for interval T) after each performance. Accordingly, the target injection rate $r_i(t+T)$ may be modified over time in response to changes in network congestion. Applying the equations described above, first host 305$_1$ may calculate 430 a target injection rate $r_i(t+T)$ that is negatively correlated with $RTT_i(t)$. Accordingly, as $RTT_i(t)$ increases due to network congestion, the target injection rate $r_i(t+T)$ may be reduced. Conversely, as $RTT_i(t)$ decreases due to a reduction in network congestion, the target injection rate $r_i(t+T)$ may be increased.

Adaptive Responsiveness

In some embodiments, the responsiveness parameter γ may be adapted during execution of method 400. Adaptation of γ may enhance stability, such as by discouraging overshooting or undershooting link capacity, when multiple hosts 305 communicating over a congested link in system 300 modify $r_i(t+T)$ in the same direction within a relatively short amount of time. Accordingly, some embodiments facilitate dynamically adjusting γ based on the severity of the network congestion, thereby controlling the amplitude of the target injection rate adjustment based on observed congestion conditions.

The responsiveness parameter γ may be adjusted based on a quantity of times the queuing delay $q_i(t)$ violates one or more predetermined threshold values. This quantity may be referred to as a violation count. In exemplary embodiments, during a predetermined observation window $T_\gamma = \alpha \cdot T$ where α is an integer constant (e.g., a=100), first host 305$_1$ determines 475 the quantity of queuing delay threshold violations. Such threshold violations may include the number of times $n_{q_{max}}$ that the queuing delay $q_i(t)$ exceeds the maximum value $q_{max}$ and/or the number of times $n_{q_0}$ that the queuing delay $q_i(t)$ is equal to zero. The quantity of queuing delay threshold violations is compared 480 to a predetermined maximum violation count. If the quantity of queuing delay threshold violations is greater than the maximum violation count first host 305$_1$ adjusts 485 the responsiveness parameter γ. Exemplary pseudo-code associated with the γ adaptation algorithm is shown in Listing 1 below.

Listing 1

```
@ every q measurement interval
    count++;
    if (q >= q_max) {
        n_q_max++;
    } else if (q == 0) {
        n_q_0++;
    }
    if (count >= a) {
        if (n_q_max > N_q_max) {
            gamma *= 1/2;
        }
        if (n_q_0 > N_q_0) {
            gamma += 1/4 * gamma;
        }
```

-continued

Listing 1

```
n_q_max = 0;
n_q_0 = 0;
count = 0;
}
```

In exemplary embodiments, when $n_{q_{max}}$ exceeds a corresponding maximum violation threshold value $N_{q_{max}}$ (e.g., 3), a queue at some link within network path 330 may be assumed to be over capacity, possibly because too many flows are colliding at that link. Accordingly, γ may be decreased by ½ γ. This process may be performed until no further "queue full" events are observed and/or a minimum value $\gamma_{min}$ is reached.

Conversely, when flows that originally contributed to network congestion are no longer active, the current value of γ for the remaining flows may be too small to allow for a rapid recovery. This condition may be inferred based on the queuing delay $q_l(t)$. During the same observation window mentioned above, the number of times that the queue has become empty $n_{q_0}$ is counted. A queue may be assumed to be empty if $q_l(t)$ is equal to zero or substantially equal to zero. When $N_{q_0}$ exceeds a corresponding maximum violation threshold value $N_{q_0}$ (e.g., 30), a link within network path 330 may be assumed to be underutilized. Accordingly, γ may be increased by ¼ γ. This process may be performed until no further "queue empty" events are observed and/or the original value of γ is reached. Asymmetry in the γ increment and decrement processes may facilitate avoiding instability in network congestion management.

Figure 5:
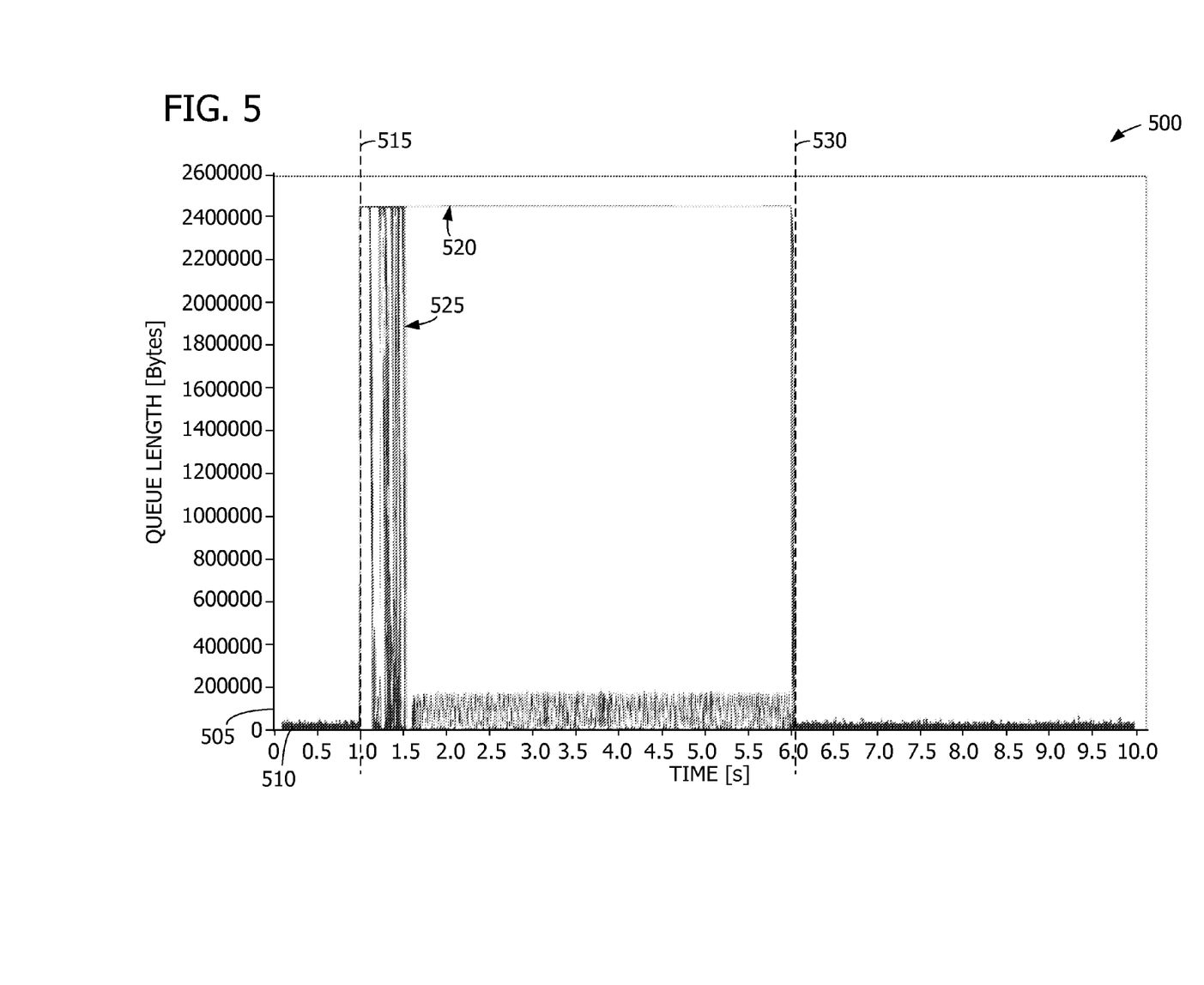
FIG. 5 is a chart depicting packet queue length over time in a simulation of a congested network with and without congestion management as described herein.
Figure 6:
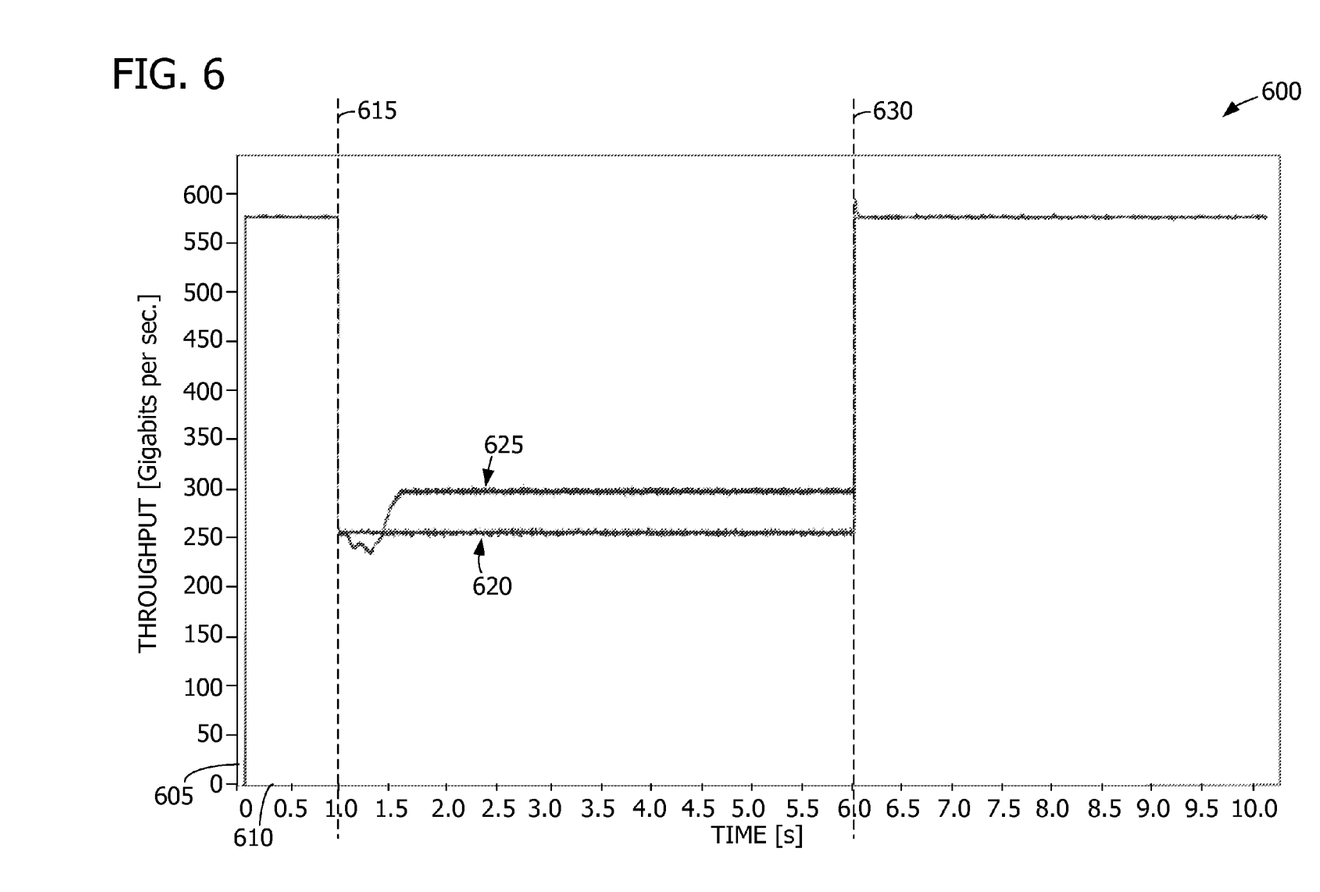
FIG. 6 is a chart depicting network throughput over time in a simulation of a congested network with and without congestion management as described herein.

Based on simulation results, embodiments described herein appear to effectively mitigate the effects of network congestion. FIG. 5 is a chart 500 depicting packet queue length, plotted on a y-axis 505, over time, plotted on an x-axis 510, in a simulation of a congested network with and without congestion management as described herein. FIG. 6 is a chart 600 depicting network throughput, plotted on a y-axis 605, over time, plotted on an x-axis 610, in a simulation of a congested network with and without congestion management as described herein.

Referring to FIGS. 5 and 6, the simulation depicted is associated with a three-tier, non-blocking (constant bisectional bandwidth), fat tree network topology commonly used in large datacenters and similar in topology to that shown in FIG. 3. 64 hosts running as many VMs are connected to the switches at the bottom layer, or access layer. The middle layer, or distribution layer evenly distributes traffic towards the top layer, or core layer. In order to equalize latency on all possible paths, traffic is forwarded to the core switches and back to the leaves of the tree (e.g., to the hosts). All links have a capacity of 10 gigabits per second (Gbps) and a propagation delay of 5 microseconds (μs), corresponding to 1 kilometer of fiber optic cable. Hence, the minimum RTT is 37.2 μs, assuming a packet size of 1500 bytes (B). The hosts generate Bernoulli-like traffic with a uniformly distributed random destination, and the offered load is 0.9. Under these operational conditions, the aggregate throughput of such network is 576 Gbps.

A congestion condition is artificially created at t=1 second (s) by changing the traffic matrix in such a way that the VM on one host, host 0 ($h_0$), is chosen with a probability of 0.5, while the other destinations remain uniformly distributed. This configuration change, shown as a first vertical line 515 in chart 500 and as a first vertical line 615 in chart 600, results in an overload of the links laying on all the paths connecting the core layer to $h_0$. The queues associated with these links immediately fill up, as shown by an unmanaged line 520 in chart 500, and start dropping the excess traffic, causing the aggregate throughput to fall, as shown by an unmanaged line 620 in chart 600.

Ideally, only the "culprit" traffic (e.g., the excess traffic) directed to $h_0$ would be dropped, resulting in a aggregate throughput of 298 Gbps. However, the congested links, besides the "culprit" traffic, are also carrying "innocent" traffic, such as traffic directed to a non-congested destination (e.g., VMs residing on $h_1$ through $h_{15}$). This causes a further drop in the aggregate throughput as shown by unmanaged line 620, which falls to 255 Gbps instead of 298 Gbps for the whole duration of the congestion event.

A managed line 525 in chart 500 and a managed line 625 in chart 600 depict queue length and aggregate throughput, respectively, with congestion management as described herein enabled. After an initial transient where the algorithm throttles sufficiently down the injection rate of the culprit traffic, managed line 525 shows that the congested queues drain one by one until the entire backlog has dissipated. Eventually, only one queue remains non-empty, i.e., the queue associated with the link connecting the leftmost access layer switch to $h_0$, because this link is the only real bottleneck in the system. When the congested queues begin emptying, the aggregate throughput, shown by managed line 625, begins to increase, indicating that the innocent traffic is no longer being dropped. When the last queue has become empty, the aggregate throughput reaches the expected value of 298 Gbps.

At t=6 s, the artificial congestion condition is removed by restoring the original traffic matrix, such as by ensuring that all destinations are again chosen with equal probability. The removal of the congestion condition is shown as a second vertical line 530 in chart 500 and as a second vertical line 630 in chart 600. As illustrated by chart 500 and chart 600, the congestion management methods described herein recover from the congestion condition as quickly as the case where no congestion management is employed.

The methods described herein may be performed by computing devices, such as hosts 305 in cluster system 300 (shown in FIG. 3). The computing devices communicate with each other through an exchange of messages and/or stored data. A computing device may transmit a message as a broadcast message (e.g., to an entire network and/or data bus), a multicast message (e.g., addressed to a plurality of other computing devices), and/or as a plurality of unicast messages, each of which is addressed to an individual computing device.

Exemplary Operating Environment

The operations described herein may be performed by a computer or computing device. A computer or computing device may include one or more processors or processing units, system memory, and some form of computer readable media. Exemplary computer readable media include flash memory drives, digital versatile discs (DVDs), compact discs (CDs), floppy disks, and tape cassettes. By way of example and not limitation, computer readable media comprise computer-readable storage media and communication media. Computer-readable storage media store information such as computer readable instructions, data structures, program modules, or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the disclosure are operative with numerous other general purpose or special purpose computing system environments or configurations. Examples of well known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

The operations illustrated and described herein may be implemented as software instructions encoded on a computer-readable medium, in hardware programmed or designed to perform the operations, or both. For example, aspects of the disclosure may be implemented as a system on a chip.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing network congestion between virtual machines, the system comprising:
    a communication interface configured to:
        transmit a message to a network destination; and
        receive a response to the message from the network destination; and
    a processor coupled to the communication interface and programmed to:
        execute a first virtual machine (VM);
        determine an instantaneous round trip time (RTT) corresponding to a network path between the system and the network destination based on the transmitted message and the received response;
        calculate a queuing delay based on a difference between the determined RTT and a minimum RTT observed by a flow of data packets over the network path;
        calculate a latency ratio based on a difference between a predetermined maximum queuing delay and the calculated queuing delay;
        calculate a target injection rate based on the latency ratio;
        transmit a plurality of data packets from the first VM to a second VM via the communication interface using an inter-packet delay that is based on the calculated target injection rate.

2. The system of claim 1, wherein the processor is programmed to calculate the target injection rate based further on a previously determined target injection rate.

3. The system of claim 1, wherein the processor is further programmed to repeatedly calculate the target injection rate based on an RTT measurement interval.

4. The system of claim 1, wherein the processor is further programmed to calculate a target injection rate that is negatively correlated with the RTT.

5. The system of claim 1, wherein the processor is further programmed to calculate the target injection rate based further on a minimum injection rate representing a priority associated with the first VM.

6. The system of claim 1, wherein the processor is further programmed to configure a virtual network interface card (vNIC) associated with the first VM to transmit data packets from the first VM to the second VM based on the target injection rate.

7. The system of claim 1, wherein the processor is further programmed to calculate the inter-packet delay based on the calculated target injection rate.

8. The system of claim 1, wherein the inter-packet delay is applied between each of the plurality of data packets such that a delay between each of the plurality of data packets is equal.

9. The system of claim 1, wherein the processor is further programmed to:
    determine a quantity of times the queuing delay violates a predetermined threshold value to create a violation count; and
    adjust the inter-packet delay when the violation count exceeds a predetermined maximum violation count.

10. A method comprising:
    determining, by a computing device, a round trip time (RTT) for a transmission of a packet over a network path between a network source and a network destination;

calculating a queuing delay based on a difference between the determined RTT and a minimum RTT observed by a flow of data packets over the network path;

calculating a latency ratio based on a difference between a predetermined maximum queuing delay and the queuing delay;

calculating by the computing device a target injection rate based on the latency ratio; and transmitting, by the computing device a plurality of data packets along the network path using an inter-packet delay that is based on the target injection rate.

11. The method of claim 10, wherein determining the RTT comprises:
transmitting a frame to the network destination, wherein the transmitted frame elicits a transmission of an echo frame from the network destination;
receiving the echo frame from the network destination; and
calculating an elapsed time between said transmitting and said receiving.

12. The method of claim 10, wherein determining the RTT comprises:
adding a transmission timestamp to a network packet that is addressed to the network destination, wherein the transmission timestamp represents a current time when the transmission timestamp is added to the network packet;
transmitting the network packet to the destination;
receiving a response to the network packet, wherein the response includes the transmission timestamp; and
determining an elapsed time between the transmission timestamp from the received response and a current time.

13. The method of claim 10, wherein calculating the target injection rate comprises calculating the target injection rate based further on a previously determined target injection rate.

14. The method of claim 10, wherein calculating the target injection rate comprises combining a current calculation with a previously determined target injection rate using a weighted moving average.

15. The method of claim 14, wherein the weighted moving average is based on a responsiveness parameter representing a weight to apply to the current calculation, said method further comprising:
adjusting the responsiveness parameter based on a quantity of times the queuing delay violates a threshold value.

16. The method of claim 10, wherein calculating the target injection rate comprises calculating the target injection rate based further on a minimum injection rate associated with one or more of the following: the network source and the network path.

17. One or more non-transient computer-readable storage media embodying computer-executable components, said components comprising:
a measurement component that when executed causes at least one processor to determine a round trip time (RTT) for a transmission of a data packet along a network path; and
a rate control component that when executed causes the at least one processor to:
determine a queuing delay based on a difference between the RTT and a minimum RTT observed by a flow of data packets over the network path;
calculate a latency ratio based on the queuing delay and a predetermined maximum queuing delay threshold;

calculate a target injection rate based on the latency ratio and a number of times the queuing delay occurs; and
transmit a plurality of data packets along the network path using an inter-packet delay that is based on the target injection rate.

18. The non-transient computer-readable storage media of claim 17, wherein the rate control component causes the processor to calculate the queuing delay based further on a minimum observed queuing delay associated with the network path, and wherein the calculated queuing delay and the minimum observed queuing delay represent elapsed times.

19. The non-transient computer-readable storage media of claim 17, wherein the rate control component causes the processor to calculate the target injection rate based further on a minimum injection rate.

20. The non-transient computer-readable storage media of claim 17, wherein the rate control component causes the processor to calculate the target injection rate based further on a previously calculated target injection rate.

21. The non-transient computer-readable storage media of claim 17, wherein the rate control component causes the processor to transmit data packets using an inter-packet delay that is based on the target injection rate at least in part by delaying packets transmitted by a virtual machine.

22. A system comprising:
a memory for storing a previous target injection rate representing a rate at which data packets are to be transmitted along a network path;
a processor coupled to the memory and programmed to:
determine a round trip time (RTT) for a transmission of a packet over the network path;
calculate a raw injection rate based on the previous target injection rate, a latency ratio, a queuing delay, and a minimum injection rate, wherein the queuing delay is based on a difference between the determined RTT and a minimum RTT observed by a flow of data packets over the network path, and wherein the latency ratio is based on a difference between a predetermined maximum queuing delay and the queuing delay;
calculate a current target injection rate by combining the previous target injection rate and the raw injection rate as a weighted average using a responsiveness parameter that represents a weight to apply to the raw injection rate;
determine a quantity of times the queuing delay violates a predetermined threshold value to create a violation count;
adjust the responsiveness parameter when the violation count exceeds a predetermined maximum violation count; and
a communication interface configured to transmit a plurality of data packets along the network path based on the current target injection rate.

23. The system of claim 22, wherein the queuing delay being greater than a predetermined maximum queuing delay threshold violates the predetermined threshold value.

24. The system of claim 22, wherein the queuing delay being equal to zero violates the predetermined threshold values.

25. The system of claim 22, wherein the processor is further programmed to calculate an inter-packet delay based on the current target injection rate, and the communication interface is configured to transmit the data packets using the inter-packet delay.

* * * * *